United States Patent [19]

Susemihl

[11] Patent Number: 4,528,488
[45] Date of Patent: Jul. 9, 1985

[54] WARNING DEVICE USING POWER TOOL RESIDUAL KINETIC ENERGY

[76] Inventor: Rolf Susemihl, Altes Sonnenbad, D-6380 Bad Homberg v.d. Hohe, Fed. Rep. of Germany

[21] Appl. No.: 503,138
[22] PCT Filed: Oct. 5, 1982
[86] PCT No.: PCT/DE82/00196
   § 371 Date: Jun. 3, 1983
   § 102(e) Date: Jun. 3, 1983
[87] PCT Pub. No.: WO83/01218
   PCT Pub. Date: Apr. 14, 1983

[30] Foreign Application Priority Data
   Oct. 7, 1981 [DE] Fed. Rep. of Germany ....... 3139872
   May 17, 1982 [DE] Fed. Rep. of Germany ....... 3219901

[51] Int. Cl.³ .............................................. H02P 3/00
[52] U.S. Cl. ................. 318/382; 83/DIG. 1; 83/522; 340/680; 318/490
[58] Field of Search ............... 318/382, 490; 83/DIG. 1, 522; 340/679, 680; 188/158

[56] References Cited

U.S. PATENT DOCUMENTS

| | | | |
|---|---|---|---|
| 1,005,222 | 10/1911 | Ihlder | 318/382 X |
| 1,008,189 | 11/1911 | Sundh | 318/382 |
| 2,392,068 | 1/1946 | Sexton | 188/158 |
| 2,564,413 | 8/1951 | Vossen | 340/679 X |
| 2,766,416 | 10/1956 | Myles et al. | 318/382 X |
| 2,969,130 | 1/1961 | Logan | 192/0.02 |
| 3,109,164 | 10/1963 | Happe et al. | 318/490 |
| 3,926,081 | 12/1975 | Roberts | 83/522 X |
| 4,132,932 | 1/1979 | Morton et al. | 318/382 |

Primary Examiner—B. Dobeck
Assistant Examiner—Bentsu Ro
Attorney, Agent, or Firm—John J. Byrne; Bradford E. Kile; Kevin M. O'Brien

[57] ABSTRACT

A warning and braking device for use on a power cutting tool such as a circular saw or a lawnmower comprises a generator, a drive shaft and a pulley connected by a lever to the power tool on/off switch. When the power tool is in the working "on" position, the generator assembly does not contact the power tool drive belt and no electric current is produced by the generator. When the power tool switch is shifted to the off position, however, the pulley on the generator drive shaft is brought into contact with the drive belt, exerting a braking force on the drive belt and producing an electrical signal from the generator which is connected to a warning device such as a light or a siren.

2 Claims, 3 Drawing Figures

WARNING DEVICE USING POWER TOOL RESIDUAL KINETIC ENERGY

TECHNICAL FIELD

The invention concerns a safety drive for a working machine driven by an electromotor and displaying a moving tool which is potentially hazardous, as well as a input shaft for the tool, an electromotor with an output shaft, a drive mechanism connecting the output shaft with the input shaft, and a switch to activate the electromotor.

The invention was designed particularly with a view to its application in circular saws, but can also be employed for other tools, for example, electric lawnmowers which operate with a rotating blade.

UNDERLYING STATE-OF-THE-ART

Machines of this type, some of which are equipped with very quickly rotating tool parts, present the danger that after the electrical drive motor is shut off the tool will continue to run for some time, which may result in bodily injury when the tool is handled without due caution. The most recent safety regulations therefore demand that, for example, the circular blade of a table-top circular saw must come to rest within 10 seconds after the machine is shut off.

To be sure, there is no lack of technical solutions intended to fulfill this demand; in reasonably priced work machines, particularly for household work, the incorporation of these costly technical measures can affect the price at which the machine is sold. In the production of these machines an attempt is made to largely employ moderately priced, serial components, which applies particularly to electrical drive motors; these components are selected from marketable standard series and are produced in accordance with all the new technical requirements, thus generally causing a sizeable price increase.

DISCLOSURE OF INVENTION

The objective of the present invention is, therefore, to create a safety drive for a work machine driven by an electromotor, which safety drive fulfills the demand that the tool part have a short overrun period once the motor has been shut off, and which can be constructed from the simplest and most conventional components.

This objective is fulfilled in a safety drive of the initially described type by an electric generator which is provided with a drive element and is positioned in the area of the drive mechanism in such a way that it can be engaged with the drive mechanism, and by an activating device connected with the switch of the electromotor, which device engages the generator with the drive mechanism when the switch is disengaged. In choosing the small generator, a series-produced, reasonably priced drive generator is preferred, which at the simplest would need to be equipped only with a clamp and a corresponding belt pulley for suitable interaction with a drive belt. In the case of circular saws, it is in general desirable for the the saw blade to extend beyond the table plate in order to assure the highest possible cutting level with the giving saw blade. This naturally demands that the axis of rotation of the blade, viewed fro the lower side of the table plate, can be brought as close as possible to the working surface of the table plate. This is hardly possible with a coaxial positioning of the electromotor, since in any case the motor must have a greater diameter than a belt pulley of minimum diameter on the tool drive shaft. The use of a belt drive is therefore of added advantage under these circumstances.

The warning light fed by the generator can be advantageously placed on the blade protecting bonnet of a circular saw, it being possible to use both the bonnet fastener and the splitting wedge as parts of the current line to the warning light. On the other hand, it is possible, as is the case with other working machines, to place the warning light directly in the operating handle for the motor switch.

In many working machines, including circular saws, it customary to design the activating element for the motor switch in the form of a stick-like switch lever whose upper end projects out of the machine frame. Under the invention it is possible to provide this switch lever with a corresponding activating rod, by means of which the moveably fastened generator can be meshed with the belt drive when the switch lever is disengaged.

Since it is generally useful to provide the generator with a certain elastic reset capacity, the danger might exist of the switch lever being pushed out of its off position, thus disengaging the generator from the drive belt. In shutting off the motor and engaging the generator, it is therefore necessary in such designs to provide the switch lever with a locked position from which it can be released only through active operation of a locking element. A weighted catch, for example, can serve as locking element, as will be described in greater detail below on the basis of specific embodiments. A locked position of the switch lever also protects the tool from being turned on unintentionally.

In certain cases of application it may also be useful to replace the mechanical activating tool for engaging the small generator with an electromagnetic actuator connecting the electric small generator with the drive mechanism by means of the generator's drive element. When a friction clutch is used as drive element the electromagnetic actuator can, for example, consist of an additional electromagnetic clutch, by means of which the friction clutch can be engaged.

An effective design of the electromagnetic actuator can assure that in excited condition it does not engage the small generator with the drive mechanism, but rather that the small generator is disengaged from the drive mechanism when the electromagnetic actuator receives an electric stimulus. This can be achieved, for example, by means of a mechanical reset spring in the actuator, whose force keeps the small generator in its position against the drive mechanism of the tool when the actuator is not provided with current. The advantage of this arrangement consists in the fact that even during current failure or other interruption of the electrical supply of the tool the safety device retains its effectiveness.

The electrical activation of the electromagnetic acutator is directly connected with the switch to activate the tool's electromotor.

As an alternative to the safety drive in which the small generator is engaged with the drive mechanism by the activating device after the switch is released, the safety drive can be equipped with a mechanical braking device which is engaged with the drive mechanism by means of the activating device when the switch is released. This braking device can then operate, for example, a mechanical siren which gives off a warning signal.

Likewise, when the motor requires braking the kinetic energy can be employed by the braking device to activate an optical-mechanical warning and signal device Here it is particularly useful to have a red signal panel which becomes easily visible to the operating person when the switch is released, which panel is kept visible by the braking device and a rod system until the machine comes to a complete stop.

As compared with an electrical warning and signal device a purely mechanical warning and signal device of this type has the advantage that it is not susceptible to disturbance under certain unfavorable conditions, such as moisture. It is also cheaper than an electrical warning and signal device.

If the highest standard of safety is demanded, a combined mechanical and electric warning and signal device can be employed, providing both a audible warning tone and a warning light.

BRIEF DESCRIPTION OF DRAWINGS

In the following the safety drive used in a circular-saw is more closely described on the basis of the attached diagrams. The diagrams show.

OPTIMUM EMBODIMENT OF THE INVENTION

In the following, only those parts of the shown circular saw will be described which are of importance to the safety drive. Apart from this the saw has a known design.

Figure 1:
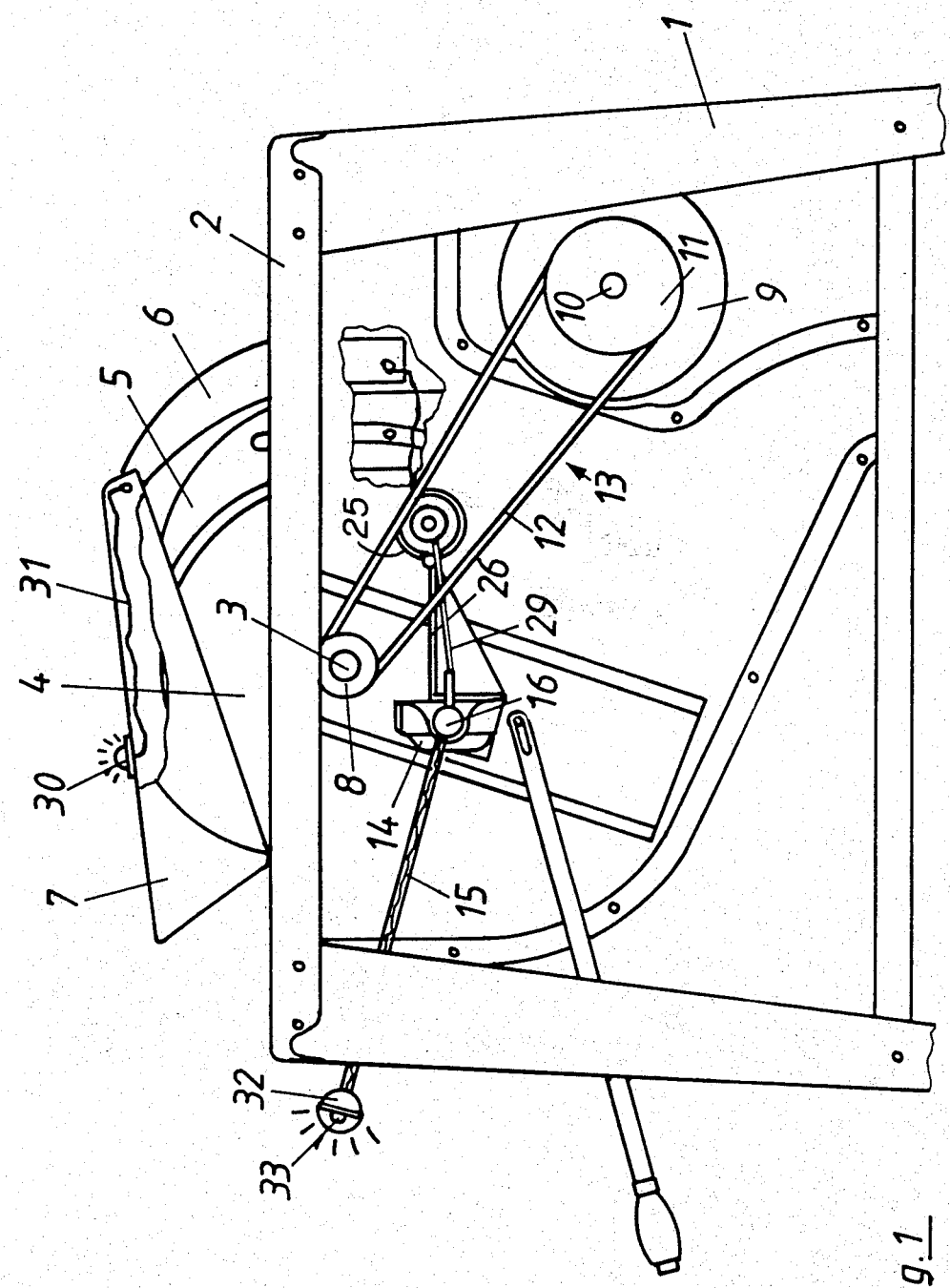
FIG. 1 a circular-saw bench with safety in a side view.

The saw has a frame or a stand 1, only partially shown, which is closed on its upper end by a table plate 2. Beneath the table plate 2 a circular blade 4 is pivoted on a drive shaft 3; FIG. 1 indicates the diameter of rotation only. Positioned behind the blade 4 and beneath the table plate 2 is a splitting wedge which projects upward and beyond the table plate 2 and a bonnet fastener 6 for the protecting bonnet 7 of the saw blade.

A belt pulley 8 is positioned on the opposite end from the circular saw 4. Further down in the machine frame there is an electric drive motor 9, whose drive shaft 10 is also equipped with a belt pulley 11. The belt pulleys 8 and 11 are connected and together form a belt drive 13. The belt drive 13 has the form of a V-belt drive.

To shut the electromotor 9 on and off there is an encased switch 14, which can be activated with a switch lever 15; the lever 15 projects out of the table stand on the operating side of the circular saw. The switch lever 15 is attached to the control shaft of the switch 14, the shaft simultaneously forming the pivot 16 for the switch lever 15.

Figure 3:
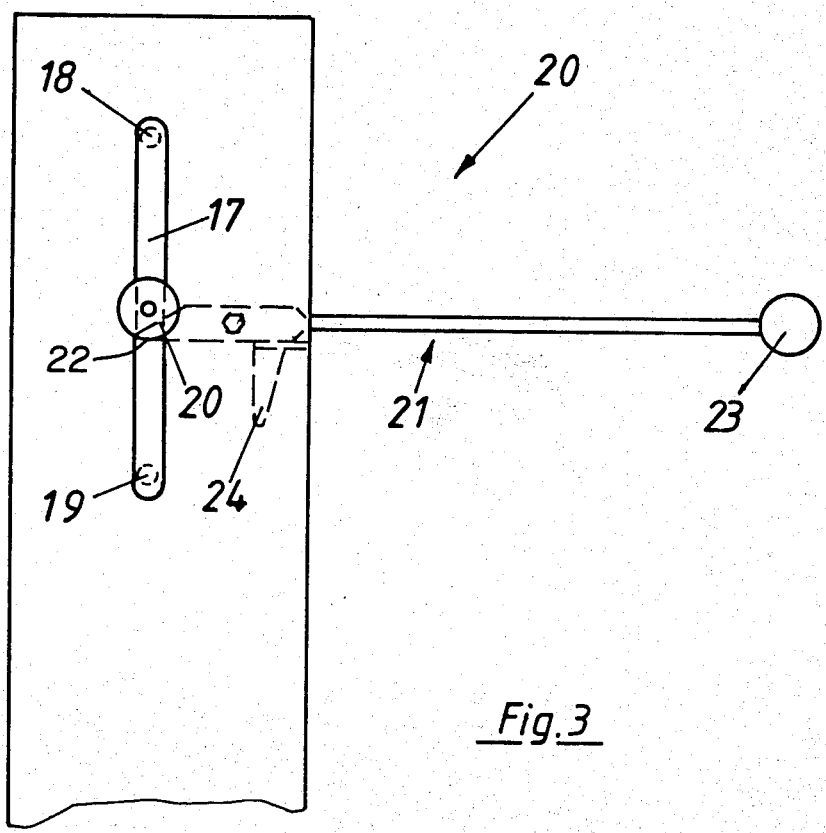
FIG. 3 a view of the locking device for the switch lever.

As indicated in FIG. 3, at the point at which it leaves the table stand the switch lever 15 runs through a vertical slot 17, in which it can be moved back and forth between the upper, engaged position 18 and the lower disengaged position 19. Next to the slot 17 there is a locking element 20 which has the form of a two-armed lever 21; one end 22 of the lever 21 crosses the slot 17 like a closing latch and is weighted with a weight 23 at its lower end. The weighted end of the double-armed lever 21 is supported by a stop dog 24 which prevents the weighted arm of the lever from leaving its horizontal position and turning in a downward direction. From FIG. 3 it can be seen that for the switch lever 15 to be switched into its disengaged position 19 it must be moved past the locking element 20, its latch-like end 22 being moved out of line with the slot 17 through lifting of the weighted end—to then return to its locked horizontal position due to the effect of the weight 23 after the motion of the switch lever 15 has been completed. Return of the switch lever 15 from its disengaged or closed position 19 is prevented by the stop dog of the locking element 20. If the switch lever 15 is to be lifted back up and returned to its engaged position, the locking element 20 must be lifted manually at its weighted end until the latch-like end 22 opens the slot 17 and makes the movement possible. This arrangement prevents the switch lever 15 from being unintentionally engaged, but at the same times serves to engage the generator, as will be more closely described below.

The entire drive unit, including the saw blade and protection devices, can be swivelled within the table stand to allow cutting of sections that incline toward the vertical; the unit swivels on horizontal axis basically running through the saw blade and lying at about the level of the table plate.

Figure 2:
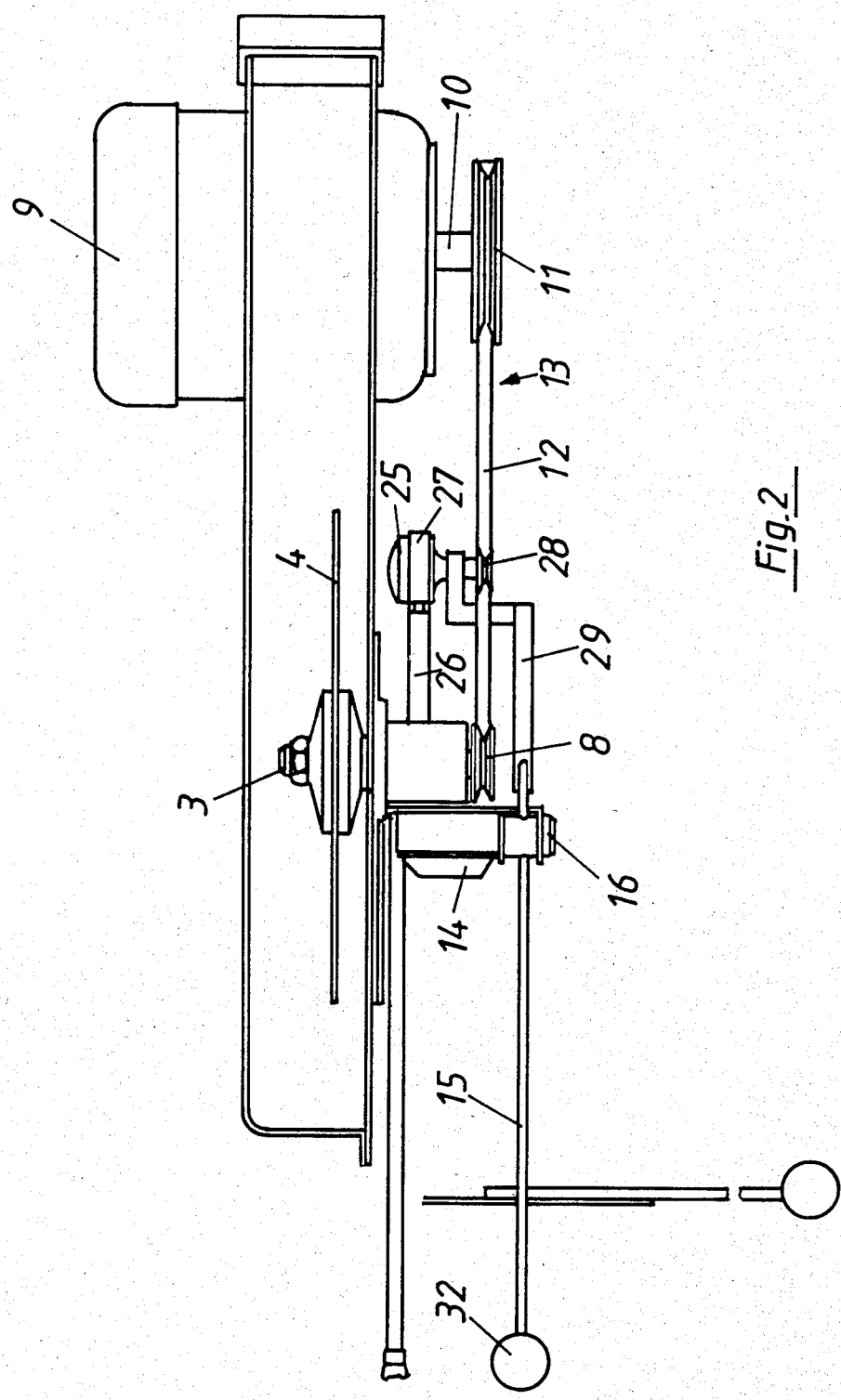
FIG. 2 a top view of the drive elements of the circular-saw.

As can be seen from FIGS. 1 and 2, a generator 25 is attached in the area of the belt drive 13 by means of a moveable fastener 26; in the embodiment example the fastener 26 consists of a leaf spring. In the example the generator 25 is a conventional small generator or bicycle generator, and for attachment to the leaf spring it is equipped with a clamp, which surrounds the generator's housing. Instead of the drive pulley usually accompanying a small generator, the generator 25 is equipped with a belt pulley. The mobility of the leaf spring fastener 26 allows the small generator 25 and its belt pulley 28 to press against the drive belt 12, so that the drive belt displaces the armature of the small generator during rotation. The small generator 25 is engaged with the drive belt by means of an activating device, consisting of a switch lever 15 and an activating rod 29, which in the embodiment example also has the form of a leaf spring. This leaf spring 29, as an extension of the switch lever 15, is attached to the latter on the other side of its pivot point 16, and on its other, angular end it connects with the neck of the small generator. A downward motion of the switch lever 15 into its off position 19, pushed toward the end of the leaf spring 19 attached to the small generator 25, so that it presses the small generator, elastically attached to the leaf spring, and its belt pulley against the upper end of the drive belt 12. The switch lever 15 off position 19, which represents a locked position, at the same time assures that the small generator 25 remains equipped with the drive belt until the switch lever 15 is deliberately released from locked position and is returned to on position 18.

When the electromotor is switched off and into locked position 19 by dropping the switch lever 15, the small generator 25 is simultaneously positioned against the drive belt 12. The kinetic rotational energy still contained in the saw blade 4 is then extinguished by the small generator 25 acting as generator. The braking effect is adjusted so that the regulations are met and the saw blade comes to a stop within 10 seconds after the motor is cut off.

The electrical energy produced during the braking action of the small generator 25 can be employed advantageously by operating an electrical warning device, which releases a signal throughout the saw blade's afterrun. In the embodiment example this warning device has the form of a warning light 30, located at an easily visible point on the protecting bonnet of the saw blade. The light is fed by a cable line 31. The bonnet holder or splitting wedge can be used as the lead-through area through the table plate for at least one of the electrical conductors. A further possibility of mounting a warning light fed by the small generator 25 is shown in FIG. 1, where the grip 32 of the switch lever 15 contains the warning light 33.

COMMERCIAL USE

The described drive mechanism, employing the most available and cheapest structural parts and components, assures that the safety requirements currently limiting the afterrun time of the saw blade are fulfilled, the energy produced by the small generator also being used advantageously to operate a warning device indicating the tool's state of motion during the brief afterrun period.

I claim:

1. A power cutting tool having a rotating blade comprising:
   an electric motor with an output shaft;
   a first belt pulley mounted on said output shaft;
   a working blade member having an input shaft;
   a second belt pulley mounted on said input shaft;
   a drive belt secured about said first belt pulley and said second belt pulley and operable to move about said pulleys;
   an electric switch having an on position and an off position and operable to actuate said electric motor in said on position;
   a mechanical lever connected to said electric switch and operable to move said electric switch between said on position and said off position;
   an electric generator having a generator input shaft and operable to generate an electric current upon rotation of said generator input shaft;
   a third belt pulley mounted on said generator input shaft;
   an activating rod anchored at one end to said generator and anchored at another end to said mechanical lever;
   an electrically actuated warning signal means electrically connected to said generator and
   a mechanical lever locking assembly positioned about said mechanical lever permitting said mechanical lever to facilely move said electric switch from said on position to said off position but preventing said mechanical lever from readily moving said electric switch from said off position to said on position, wherein when said electric switch is in said on position said drive belt moves about said first and second pulleys and does not contact said third pulley, but, when said electric switch is shifted to said off position said third belt pulley contacts said drive belt and exerts a braking action on said drive belt and a rotational action on said generator input shaft producing an electric current from said generator and actuating said warning signal means.

2. A power cutting tool as recited in claim 1 wherein: said mechanical switch lever extends through a slotted opening on one side of said tool and wherein said mechanical lever locking assembly comprises a weighted two-armed lever anchored to said side of said machine, one end of said two-armed lever extending across said slotted opening so that said lever can be briefly displaced by said mechanical lever when said mechanical lever is moved from a position corresponding to said on position of said electric switch to a position corresponding to said off position of said electric switch and another end of said two-armed lever serving as a stop means preventing said mechanical lever from being readily shifted in the opposite direction.

* * * * *